Figure 2:
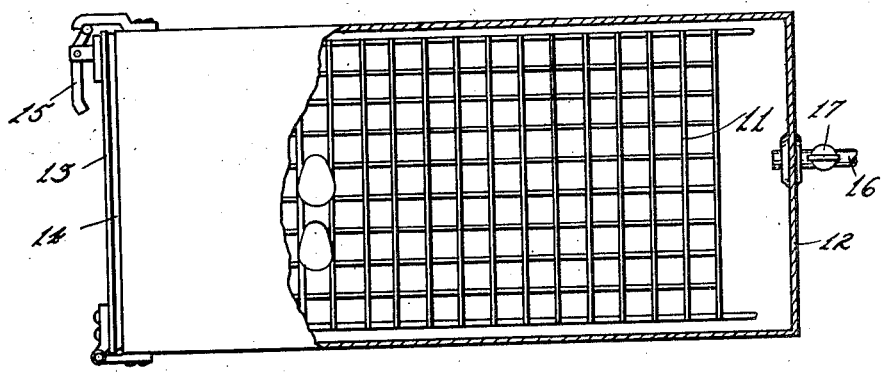

Sept. 22, 1942.    G. F. STEWART    2,296,544
METHOD FOR THE MAINTENANCE OF THE QUALITY OF
INFERTILE EGGS WHEN SUBJECTED TO HEAT
Filed May 11, 1940

Inventor.
George F. Stewart
by Orwig & Hager Attys

Patented Sept. 22, 1942

2,296,544

UNITED STATES PATENT OFFICE 2,296,544

METHOD FOR THE MAINTENANCE OF THE QUALITY OF INFERTILE EGGS WHEN SUBJECTED TO HEAT

George Franklin Stewart, Ames, Iowa, assignor to Iowa State College Research Foundation, Ames, Iowa, a corporation of Iowa Application May 11, 1940, Serial No. 334,669

1 Claim. (Cl. 119—35)

In the art of the mechanical incubation of eggs it is the present practice to subject the eggs to a partial incubating operation, then ascertain which eggs are infertile and finally removing the infertile eggs after they have lost their essential characteristics of edible quality due to the incubating process.

The object of my invention is to provide an inexpensive and easily operable method of preserving the edible qualities of eggs without in any manner inhibiting embryonic growth when subjected to incubating processes for a sufficient period of incubation to permit the operator to accurately determine their fertility or infertility, and whereby the infertile eggs will retain their edible qualities for human consumption.

A further object is to provide an inexpensive method, readily and easily practiced, for maintaining within eggs a predetermined quantity of carbon-dioxide gas or the ingredients which generate carbon-dioxide gas, either by sealing the eggs in gas-tight containers to prevent the escape of carbon-dioxide gas, or by supplying within said gas-tight container a quantity of carbon-dioxide gas sufficient to restore within the eggs a proper amount of carbon-dioxide gas to compensate for the loss of carbon-dioxide gas due to the escape of this essential gas following laying and during the preincubation period for the removal of infertile eggs. It is now well known that eggs when laid contain appreciable quantities of carbon-dioxide gas. Because of its acid nature in aqueous solutions this carbon-dioxide controls to a considerable extent the degree of alkalinity or acidity in the egg. It is also now generally known that this carbon-dioxide gas is rapidly lost from the egg contents to the surrounding atmosphere. In a well ventilated room at 70° F. it will be largely lost in 2-3 days. At higher temperatures the loss will be somewhat more rapid, and at lower temperatures the loss is more gradual. The prevention of this loss of the gas through sealing the egg in gas-tight containers within a reasonable time after laying serves to prevent the increase of the alkalinity of the egg and greatly decreases the chances for deterioration during the partial incubation test for fertility.

It is also possible to reintroduce this gas into the eggs that have not been sealed soon enough after laying to retain their natural carbon-dioxide. This will also serve to control the alkalinity in the desired range and thereby also largely prevent losses in qaulity during the incubation period.

In the accompanying drawing—

Figure 1:
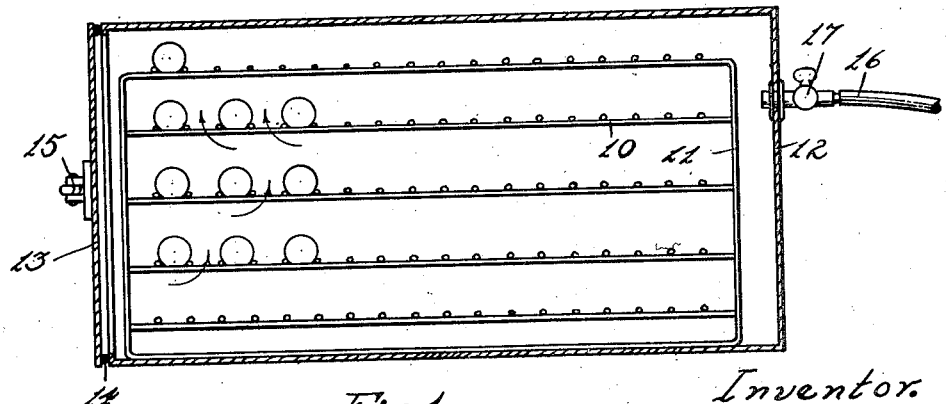

Figure 1 shows a vertical central sectional view of a gas-tight egg container for use with my improved method; and Figure 2 shows a top view of a gas-tight egg container, partly in section, with an egg-holding frame therein.

In the practice of my improved method the eggs are placed in the wire crate consisting of horizontal wires 10 and vertical wires 11 welded together and having separate space for each egg, and so proportioned that the eggs will be held separated from each other for the free circulation of air around them.

This crate of eggs is then placed in a gas-tight container comprising an outer wall 12 and a hinged door 13 provided with a gasket 14 and a latch 15. I also provide a gas filler pipe 16 at one side, having a valve 17.

Before placing the eggs in the gas-tight container I subject them to the well-known tests to determine their alkaline or acid condition. The most reliable test is the pH test. This may be conducted with the well known electrometric or colorimetric equipment. If the pH determination shows the sample of egg white to be below 8.2, the egg still contains sufficient carbon-dioxide to preserve the quality during the partial incubation period. These eggs may be placed in the sealed gas-tight container and placed in a room or container at 100° F. until the fertile eggs have developed sufficiently to make their fertility determination accurate. This may be done in from ten to thirty hours by the ordinary candling method. If the pH determination shows a sample egg white to be more alkaline than 8.2, there has been a considerable amount of the natural carbon dioxide gas lost. These eggs should be placed in a sealed gas-tight container and sufficient carbon-dioxide added to bring the pH to below 8.2. However, one must not add so much of the gas as to affect the normal development of the embryo. If the air surrounding the eggs contains over 15% by volume of carbon-dioxide, normal development of the unhatched chick is greatly hindered. Due to the porosity of the shell the carbon dioxide readily penetrates it, dissolves in the egg substance and lowers the pH in proportion to the amount dissolving.

The eggs thus treated are then subjected to a 100° F. temperature until the fertile eggs have developed sufficiently to make their determination accurate. This may be done in from 10 to 30 hours by the ordinary candling method. The infertile eggs are removed and sold for table use as little of the original quality has been lost.

To demonstrate the effectiveness of carbon-dioxide in preventing deterioration during partial incubation tests for fertility, I will recite the results of many repeated experiments.

A number of fresh eggs were secured from a flock of laying hens. These were divided into three equal samples. One sample was sealed within 8 hours after laying in a gas-tight container and stored at 60° F. The other two lots were merely placed, without sealing, at 60° F. After several days (hatching eggs are usually accumulated for several days before a sufficient number are available for incubating) the sealed eggs and one lot of the unsealed eggs were placed at 100° F. for 20-30 hours. They were then cooled to 60° F. At this time all three lots were opened and examined for their quality. It was at once apparent that the yolks and whites of the sealed eggs had lost little of their upstandingness and strong character compared to the unheated eggs. On the other hand the heated but unsealed eggs had flat, much weakened yolks, and the whites had lost much of their regular shape and thick body. In another test we again split the sample of fresh eggs into three parts. They were then placed at 60° F. for several days. Then the eggs of the one lot were placed in a gas-tight container and 5-10% carbon dioxide added. This container and one of the other lots were heated at 100° F. for 20-30 hours. The eggs were then cooled to 60° F. and finally the eggs from all three lots were opened and examined for quality. It was easily apparent that the treated eggs retained the quality found in the unheated eggs, while the heated, untreated eggs were much poorer in upstandingness of yolk and whites, the shape and consistency of white and the strength of yolk.

I claim as my invention:

The method of maintaining the edible qualities of infertile eggs when subjected to incubating temperatures, which consists in placing both fertile and infertile eggs in a substantially airtight container, introducing into the container a sufficient quantity of carbon-dioxide to bring the pH of the egg-white below 8.2, the amount of said carbon-dioxide not exceeding 15% by volume of the air in the container, then incubating the eggs in this air until the embryos of the fertile eggs have developed enough so that fertile eggs can be distinguished from infertile eggs.

GEORGE FRANKLIN STEWART.